United States Patent
Ng et al.

(10) Patent No.: US 10,832,726 B1
(45) Date of Patent: Nov. 10, 2020

(54) REMAPPING TRACKS FOR MANAGEMENT OF ADJACENT TRACK INTERFERENCE

(71) Applicant: Seagate Technology LLC, Cupertino, CA (US)

(72) Inventors: Choon Wei Ng, Singapore (SG); Kok Choon See, Singapore (SG); Jian Qiang, Singapore (SG); LiBin Cai, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/549,334

(22) Filed: Aug. 23, 2019

(51) Int. Cl.
  *G11B 20/12* (2006.01)
  *G11B 20/10* (2006.01)
  *G11B 27/36* (2006.01)

(52) U.S. Cl.
  CPC .. *G11B 20/10472* (2013.01); *G11B 20/10388* (2013.01); *G11B 20/1258* (2013.01); *G11B 27/36* (2013.01)

(58) Field of Classification Search
  CPC ... G11B 5/596; G11B 20/22; G11B 20/10009; G11B 20/10055; G11B 20/1285; G11B 20/10037; G11B 20/1217; G11B 5/012; G11B 5/5521; G11B 5/59633; G11B 5/5526; G11B 5/09; G11B 5/59627; G11B 20/12
  USPC .................................. 360/48, 46, 51, 77.08
  See application file for complete search history.

(56) References Cited

U.S. PATENT DOCUMENTS

| | | | |
|---|---|---|---|
| 7,567,397 B2 | 7/2009 | Lu | |
| 7,575,820 B2 | 8/2009 | Silva | |
| 8,331,053 B2 | 12/2012 | Hobbet | |
| 8,825,980 B2 | 9/2014 | Patil et al. | |
| 8,848,306 B2 * | 9/2014 | Sakai | G11B 5/012 360/55 |
| 9,001,442 B2 | 4/2015 | Park et al. | |
| 9,099,155 B1 | 8/2015 | Kataria et al. | |
| 9,129,628 B1 * | 9/2015 | Fallone | G11B 5/012 |
| 9,311,939 B1 * | 4/2016 | Malina | G11B 20/10527 |
| 9,336,818 B1 | 5/2016 | Dunn et al. | |
| 9,336,819 B2 * | 5/2016 | Cho | G11B 20/1879 |
| 9,454,991 B2 * | 9/2016 | Sutardja | G06F 3/0611 |
| 9,672,845 B2 | 6/2017 | Rausch | |
| 2013/0057977 A1 * | 3/2013 | Sakai | G11B 5/012 360/75 |
| 2013/0185498 A1 | 7/2013 | Islam et al. | |
| 2014/0016224 A1 | 1/2014 | Unoki et al. | |

OTHER PUBLICATIONS

Kaitsu, Isatake et al., "Ultra High Density Perpendicular Magnetic Recording Technologies", Manuscript, Fukitsu Sci. Tech. J., 42, 1, pp. 122-130, Jan. 2006, 9 pages.

* cited by examiner

Primary Examiner — Nabil Z Hindi
(74) Attorney, Agent, or Firm — Westman, Champlin & Koehler, P.A.

(57) ABSTRACT

A method includes monitoring operations performed on tracks in a main storage area of a disc, and identifying a track of the tracks in the main storage area susceptible to adjacent track interference (ATI). When a track is identified, the identified track or an adjacent track which contributes to ATI of the identified track is remapped to an ATI safe zone of the disc having a tracks per inch (TPI) density lower than a TPI density of the main storage area.

21 Claims, 4 Drawing Sheets

REMAPPING TRACKS FOR MANAGEMENT OF ADJACENT TRACK INTERFERENCE

SUMMARY

In one embodiment, a method includes monitoring operations performed on tracks in a main storage area of a disc, and identifying a track of the tracks in the main storage area susceptible to adjacent track interference (ATI). When a track is identified, the identified track or an adjacent track which contributes to ATI of the identified track is remapped to an ATI safe zone of the disc having a tracks per inch (TPI) density lower than a TPI density of the main storage area.

In another embodiment, a method includes monitoring tracks in a hard disc drive (HDD) for write or scan frequency, and designating a track in a main storage area of the HDD as an adjacent track interference (ATI) hot track when its write or scan frequency exceeds a predetermined write or scan frequency threshold. Once the track is designated as an ATI hot track, the ATI hot track is remapped to an ATI safe zone having tracks with lower susceptibility to ATI.

In yet another embodiment, an apparatus includes a data storage medium having a plurality of tracks including tracks in a main storage area having a first tracks per inch density and tracks in an ATI safe zone having a second tracks per inch density lower than the first tracks per inch density. The apparatus further includes a controller communicatively coupled to the data storage medium, the controller is configured to monitor operations performed on tracks in the main storage area, and identify a track of the tracks in the main storage area susceptible to adjacent track interference (ATI). When a track is identified, the controller remaps the identified track or an adjacent track which contributes to ATI of the identified track to the ATI safe zone.

This summary is not intended to describe each disclosed embodiment or every implementation of managing adjacent track interference in a data storage device as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1A:
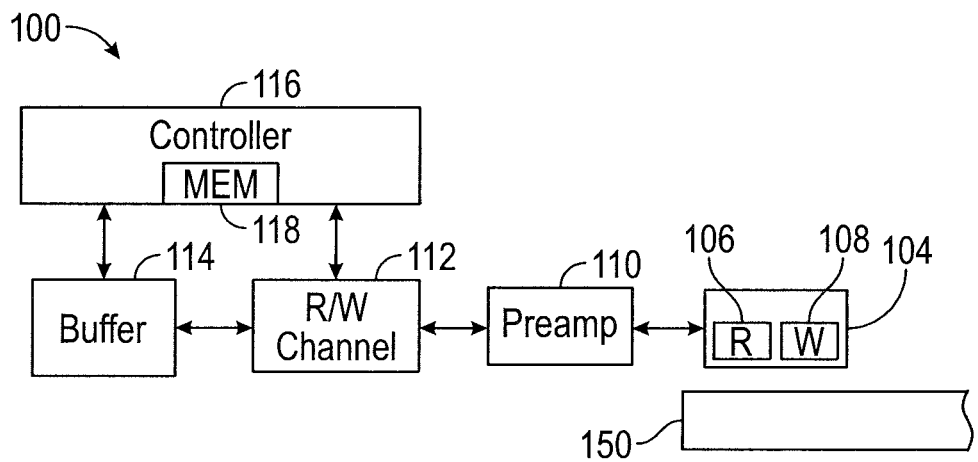
FIG. 1A is a functional block diagram of a data storage device in accordance with an embodiment of the disclosure.

Embodiments of the disclosure relate to remapping tracks in a data storage device according to track usage and adjacent track interference (ATI).

A hard disc drive (HDD) is an example of a data storage device in which data is written on tracks on a disc surface. Each time writing is performed on a track, the writing on that track may affect adjacent tracks, such as by partially erasing or partially overwriting them, due to ATI. With HDD capacity increasing but within the constraints of physical sizes of media, an increasing density of storage is provided. Bytes per inch (BPI) and tracks per inch (TPI) are two factors that are used in designs to meet a targeted disc capacity. A higher number of TPI increases storage capacity, but also increases the risk of ATI. With a higher number of TPI, additional media scan and repair work is used to make sure that the HDD performs reliably, and is able to meet reliability specified by a customer.

Embodiments of the disclosure recognize the problem of frequently written areas of an HDD having a higher possibility of ATI that can be problematic for areas of the HDD that are accessed more frequently than others by a host, such as but not limited to file allocation table (FAT) storage tracks. Details regarding the different embodiments are provided below in connection with FIGS. 1A-5.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a simplified block diagram of a data storage device 100 in which embodiments of the disclosure may be useful. The device 100 is characterized as a HDD to which data are stored on one or more rotatable data recording media (e.g., one or more discs) 150, although this is merely exemplary and not limiting.

The medium 150 is accessed by a data read/write transducer (head) 104 which is supported adjacent the rotating medium during device operation. The head 104 includes one or more read elements (R) 106 and one or more write elements (W) 108. The head 104 can include other functional elements as well such as fly-height control elements, contact and/or proximity sensors, etc.

A preamplifier/driver circuit (preamp) 110 applies signal preconditioning and preamplification to read signals from the read element(s) 106 during data read operations, and supplies write currents to the write element(s) 108 during data write operations. A read/write (R/W) channel 112 provides data encoding/decoding, a buffer memory 114 provides temporary storage of data during data transfer operations, and a controller 116 provides top level control of the device 100. The controller 116 may constitute a programmable processor that uses programming steps and control parameters in local controller memory 118. The controller functionality may alternatively be realized in hardware and/or incorporated into the other operative blocks shown in FIG. 1A.

Figure 1B:
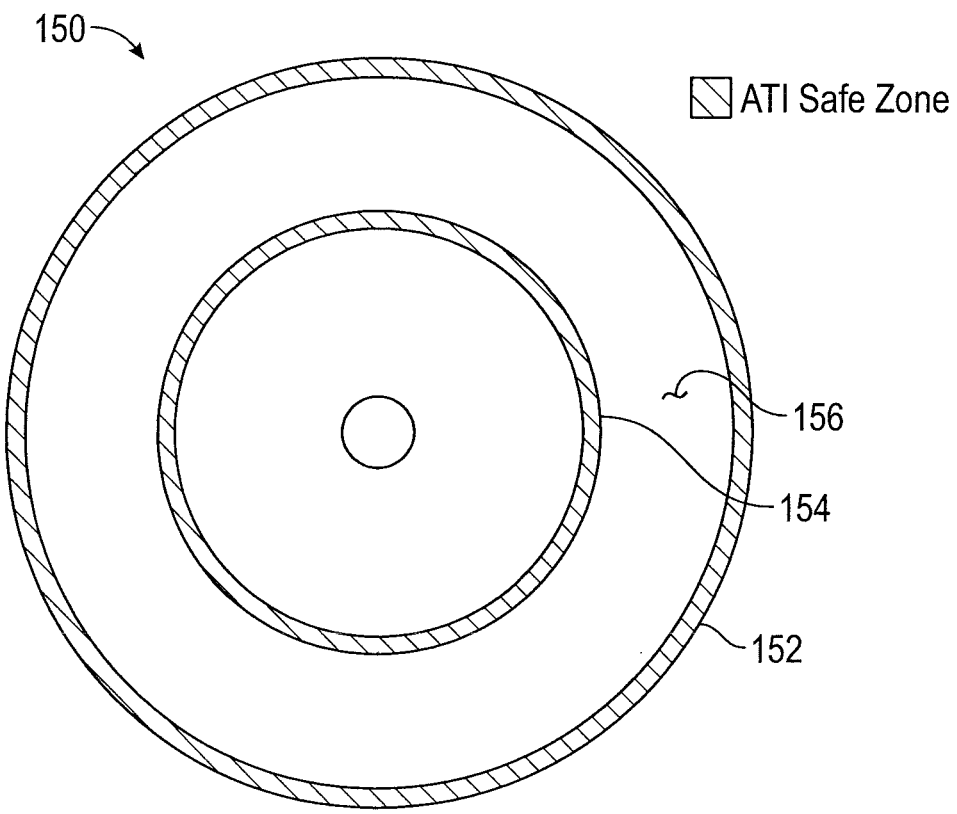
FIG. 1B is a diagrammatic illustration of adjacent track interference (ATI) safe zone tracks on a data storage medium that may be incorporated into the data storage device of FIG. 1A.

FIG. 1B illustrates a rotatable data recording medium (e.g., a disc) 150 having ATI safe zones 152 near the outer diameter of disc 150 and 154 near the inner diameter of disc 150. ATI safe zones 152 and 154 are in one embodiment physical areas of the disc 150 at which ATI is low, in one embodiment significantly lower than in main disc area 156. ATI safe zones in one embodiment are provided with a lower number of TPI, resulting in a wider spacing between adjacent tracks. ATI safe zones in another embodiment are designed to reduce ATI effects through other storage methods. For example, an ATI safe zone such as zone 152 or 154 in one embodiment uses a TPI similar or identical to that of the main disc area, but only writes to every other track, leaving a data-free track between adjacent ATI safe zone data tracks.

Under some workloads, such as surveillance, on an HDD, certain small areas of the disc are likely to be accessed by a host more frequently than others. Such areas are those that are written frequently, with updates or the like, such as but not limited to those tracks designated to be used for file allocation table (FAT) purposes. Tracks designated for use with a FAT will generally be scanned and repaired numerous times to avoid data loss. This action increases ATI potential, and may cause system failures including video frame drop and video playback lag.

Figure 2A:
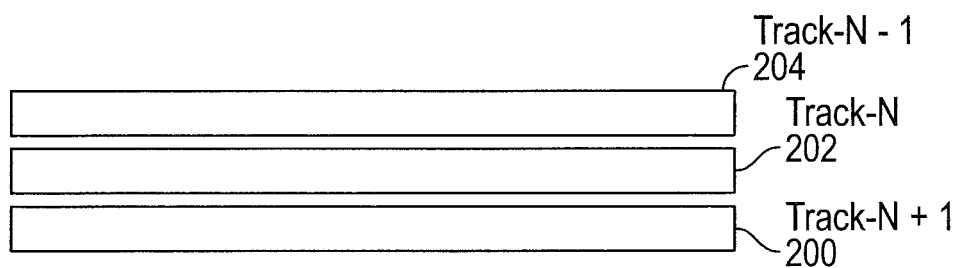
FIG. 2A is an illustration of tracks of a storage device.
Figure 2B:
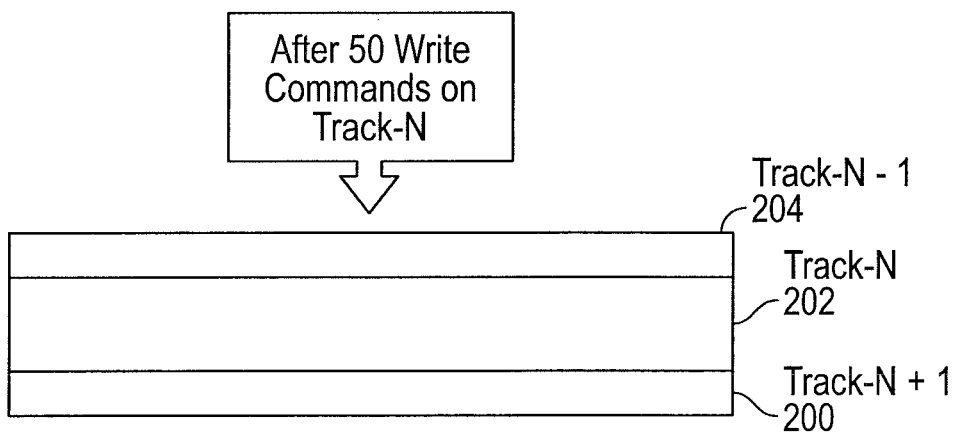
FIG. 2B is an illustration of ATI after a number of write commands on the tracks of FIG. 2A.

An example of ATI for a frequently written track on a disc of an HDD is shown in FIGS. 2A and 2B. FIG. 2A is a diagrammatic illustration of adjacent concentric tracks 200, 202, 204 that may be formed on the storage medium 150 of FIG. 1A in accordance with some embodiments. The tracks are denoted as tracks N−1, N and N+1 where N is an integer. It will be appreciated that FIG. 2A only shows a small subset of the concentric tracks that can extend from the innermost diameter to the outermost diameter of the medium. The tracks 200, 202, 204 are characterized as standard, non-shingled tracks so that data write operations can be carried out to any of the respective tracks in any order without the need to reformat the tracks (apart from periodic refreshing operations carried out responsive to the detection of ATI). It should be noted that non-shingled tracks are merely used as a non-limiting example, and different types of tracks may be employed in different embodiments.

In FIG. 2A, three adjacent tracks 200, 202, and 204 are shown. When track 202 is written more frequently than tracks 200 and 204, or is written a certain number of times, ATI effects occur that affect tracks 200 and 204, as is shown in FIG. 2B, in which ATI effects are present in tracks 200 and 204.

During a write operation to track 202, the associated write element 108 (FIG. 1A) writes data to track 202 (and to each of the other tracks) by using magnetic write fields that establish a magnetic sequence (pattern) in one or more internal recording layers of the media 150. Due to a variety of factors such as the shape and construction of the write element and the position of the write element relative to a centerline of track 202, over time, with further writes, the data on adjacent tracks (200, 204) can become corrupted by ATI, such as by magnetic flux interference on the adjacent tracks that, over many cycles, can accumulate and leave the adjacent tracks unreadable. Repeated writes on a specific track (e.g., track 202) will partially erase its adjacent tracks 200 and 204.

Once an ATI measure (e.g., count) for a track reaches a predetermined threshold, a directed offline scan, or similar error detection and correction operation, may be carried out to alleviate the effects of ATI. Tracks that are scanned and repaired numerous times, such as in FIGS. 2A and 2B, tracks 200 and 204, are designated in one embodiment as ATI hot tracks. Further, in such an embodiment, track 202 may also be designated as an ATI hot track based on high write frequency because the write operations to track 202 affect the ATI of tracks 200 and 204. Thus, hot tracks may be aggressor tracks such as 202, which contribute to ATI of other tracks, or victim tracks such as 200 and 204 that are affected by writes to the aggressor track. Embodiments of the present disclosure identify ATI hot tracks on an HDD. Then, the ATI hot tracks are remapped to a zone or zones of the HDD that are designed to have low ATI risk, in one embodiment to tracks in the ATI safe zones 152, 154 discussed above. Remapping is performed in one embodiment using logical block address (LBA) remapping schemes to dynamically remap ATI hot tracks to a zone or zones identified as an ATI safe zone. Such ATI safe zones include in one embodiment sections of the hard disc with a smaller number of TPI, so that media scan and repair work is reduced in those tracks, even with more frequent writes.

Figure 3:
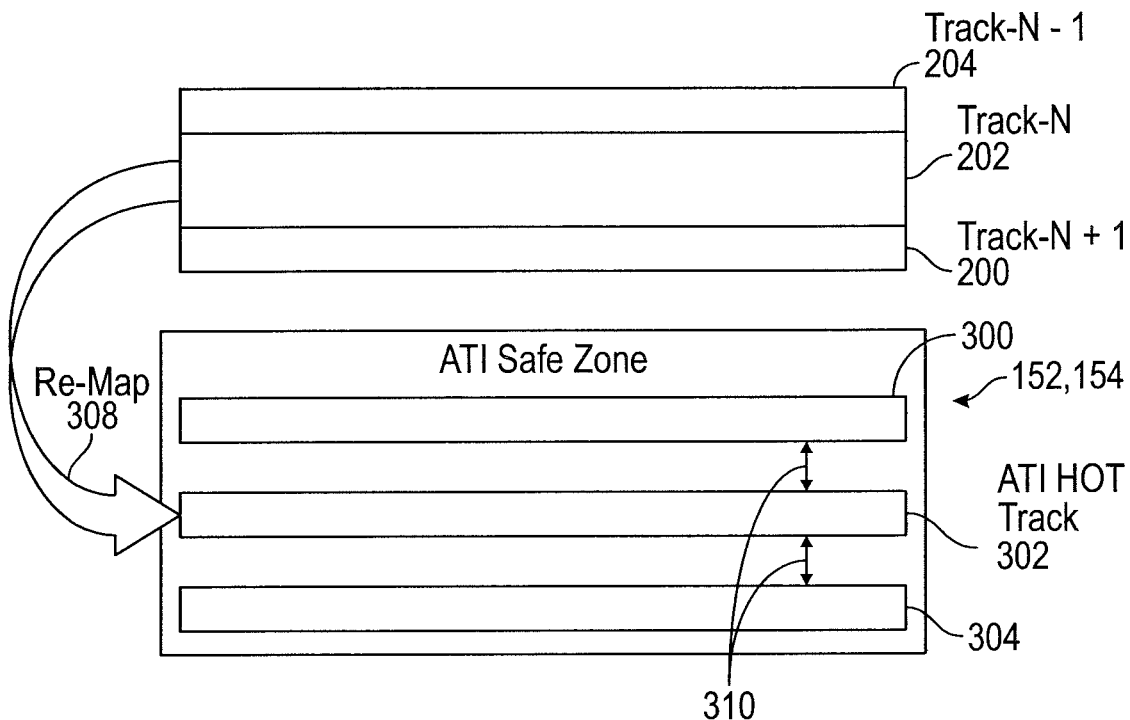
FIG. 3 is an illustration of a remap process for ATI hot tracks according to an embodiment of the present disclosure.

In one embodiment, ATI safe zones 154 and 152 are located, respectively, near the inner diameter and outer diameter of the discs of the HDD. ATI safe zones 152, 154 in one embodiment contain safe zone tracks such as tracks 300, 302, 304 as shown in FIG. 3. In one embodiment, the tracks of the safe zone are separated by gaps 310 that are larger than gaps between tracks in a main storage area such as area 156. That is, in one embodiment, tracks 300, 302, 304 in an ATI safe zone 152, 154 have a lower TPI than tracks 200, 202, 204 in main storage area 156.

ATI hot tracks (such as tracks 200, 202 and 204) are detected in one embodiment based on write or scan frequency of the tracks in the main storage area 156. In one embodiment, if a threshold number of writes or scans is performed on a particular track, that track may be designated an ATI hot track. Remapping of ATI hot track 202 to safe zone track 302 is shown on arrow 308 in FIG. 3. The method by which ATI hot track 202 is remapped to track 302 is in one embodiment performed according to known LBA remapping schemes, and will not be discussed further herein.

Figure 4:
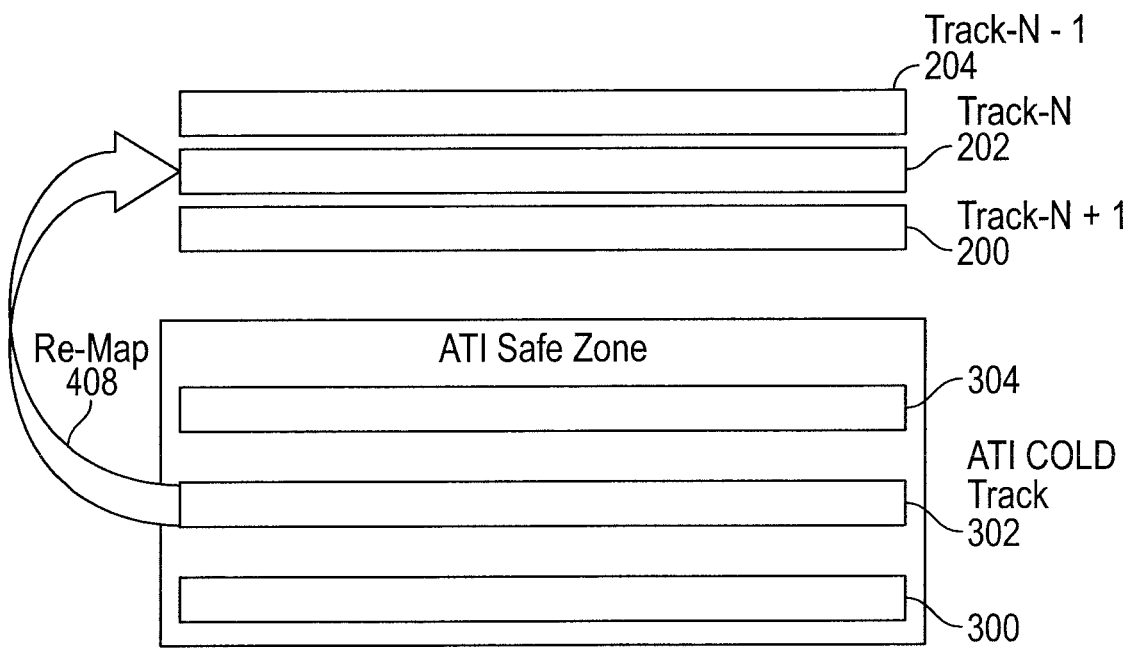
FIG. 4 is an illustration of a remap process for ATI cold tracks according to an embodiment of the present disclosure.

If an already designated ATI hot track has a reduction in its write or scan frequency before a remapping as shown in FIG. 3, the designated ATI hot track may be undesignated as an ATI hot track, and not remapped. If a designated ATI hot track such as 202 has already been remapped to an ATI safe zone 152, 154, and then by virtue of a reduction in its write frequency, becomes an undesignated ATI hot track, it may be remapped back to the main storage area 156. Remapping of an undesignated ATI hot track 302, which may also be referred to as an ATI cold track, is performed in one embodiment from an ATI safe zone 152, 154 to a main storage area 156, according to arrow 408, such as is shown in FIG. 4. It should be noted that, if one or both of tracks 200 and 204 were remapped to an ATI safe zone 152, 154 instead of track 202, the track(s) 200, 204 may be undesignated as ATI hot tracks if the write frequency to track 202 in main disc area 156 falls below a predetermined write frequency threshold.

In another embodiment, if the ATI safe zone 152, 154 is full or nearly full, some tracks that are not as hot as others in the ATI safe zone 152, 154 may be remapped out of the ATI safe zone 152, 154 as shown in FIG. 4, to accommodate hotter ATI tracks from main storage area 156. Bidirectional remapping may be performed multiple times as tracks are designated and undesignated as ATI hot tracks. Such bidirectional remapping reduces seek overhead when access frequency of data in the safe zone tracks drops below that of a track that is designated as an ATI hot track, or when the scan frequency certain threshold falls below a designated level for ATI hot track designation.

Figure 5:
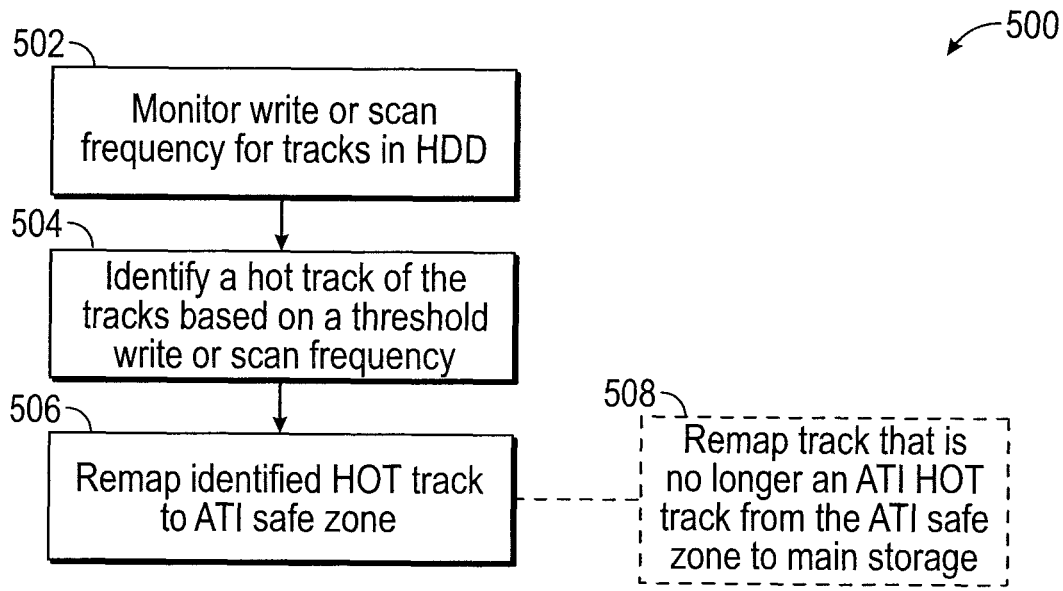
FIG. 5 is a flow diagram of a method according to an embodiment of the present disclosure.

A method 500 for detection and remapping of ATI hot tracks is shown in one embodiment in FIG. 5. Method 500 comprises, in one embodiment, monitoring write or scan frequencies of tracks in a hard disc in block 502, and identifying an ATI hot track of the tracks based on a threshold write or scan frequency in block 504. It is the identified ATI hot tracks in a main storage area of a disc that are subject to remapping to an ATI safe zone. The method further comprises remapping an identified hot track to an ATI safe zone in block 506. In an optional block, when an ATI hot track that has been remapped to the ATI safe zone is no longer an ATI hot track, the track may be remapped back to main storage in block 508.

In some embodiments, the identified ATI hot track(s) moved to an ATI safe zone may be ATI contributor or aggressor tracks such as 202. In an alternative embodiment, instead of moving the identified ATI contributor track to an ATI safe zone, a track or tracks adjacent to the identified ATI hot contributor track (e.g., ATI victim tracks), may be remapped to the ATI safe zone or to another area of the main storage area, depending upon real world work load and other conditions of the HDD. For example, if the ATI victim tracks 200 and 204 contain cold data (e.g., lacking frequent access), then the tracks 200 and 204 may be remapped instead of the target track 202.

Figure 6:
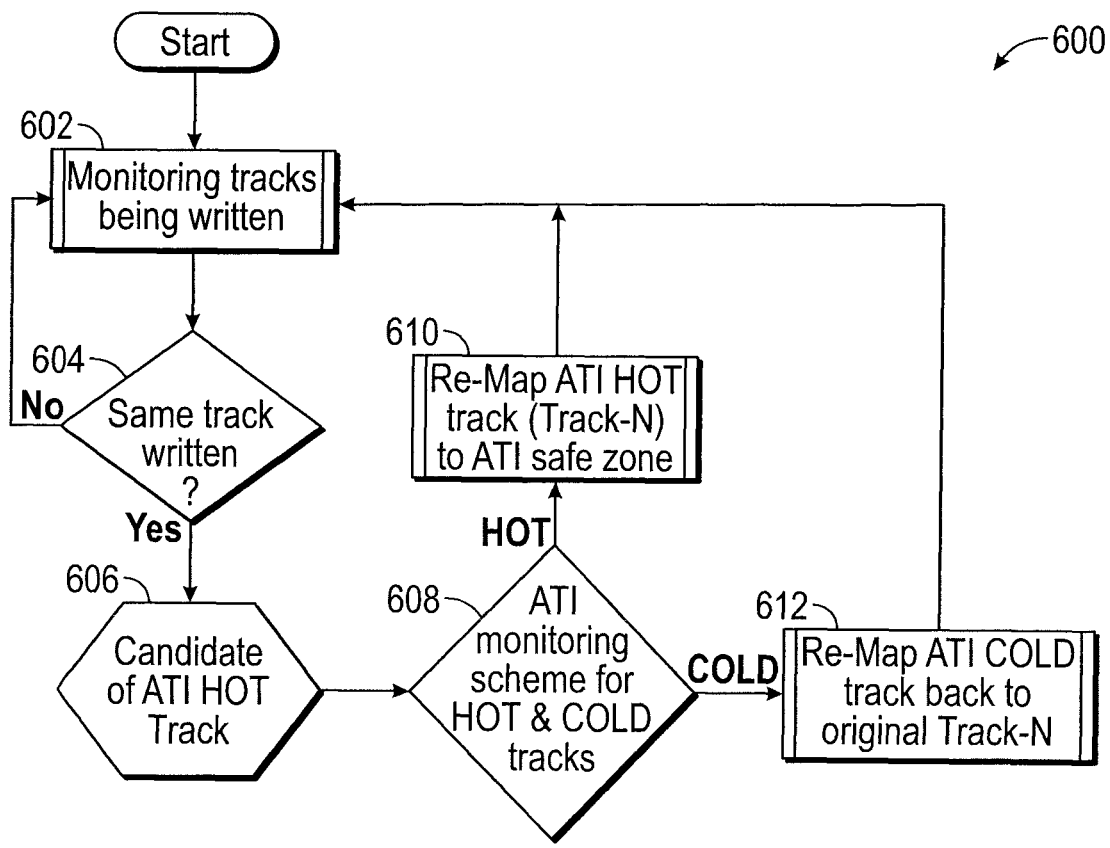
FIG. 6 is a flow diagram of a method according to another embodiment of the present disclosure.

A more detailed method 600 for detection and remapping of ATI hot tracks is shown in FIG. 6. In block 602, tracks that are being written are monitored. This monitoring can be of scan frequency, write frequency, or the like. In one embodiment, a number of the most recently written or scanned tracks have their scan frequency monitored and data on write and/or scan frequency maintained in a table. When a track that has been written is written again, as determined in decision block 604, the track is designated as an ATI hot track candidate at block 606. In one embodiment, a track is determined to be an ATI hot track when its scan frequency is over a threshold, for example, two scans per 10 seconds. In one embodiment, a scan interval that is about to cause a command completion time issue due to ATI triggers the remapping of the track. Similar ATI hot track determinations may be carried out based on write frequency.

Once a track is marked as an ATI hot track, the track is scheduled for remapping during the next scan, for example. In block 608, the table is consulted to determine if the track that is a candidate is a hot ATI track or a cold ATI track. In this decision block 608, if the track is determined to be an ATI hot track as discussed elsewhere herein, it is remapped to an ATI safe zone 152, 154 in block 610. If the track is determined to be an ATI cold track, it is remapped from its ATI safe zone 152, 154 to a track in main storage area 156 in block 612. In one embodiment, the main storage track that an ATI cold track is remapped to is its original track in the main storage area 156. Further, if the ATI safe zones 152, 154 are full or are nearly full, when an ATI hot track candidate is determined, a review of, for example, the write frequency on at least some of the existing tracks that have been remapped to the ATI safe zones is made, and an ATI cold track or a lower frequency track (e.g., a less hot track) may be remapped back to the main storage area.

In one embodiment, remapping of a track may be performed within a media repair task. An LBA remap table will be changed after the data is read to a buffer, then written to new location. The remapping may be a one track to one track remapping, although it should be understood that one track could be remapped to two tracks without departing from the scope of the disclosure.

Embodiments of the present disclosure provide methods for monitoring ATI in an HDD, for remapping hot tracks to ATI safe zones with lower ATI susceptibility, such as safe zone tracks with a lower number of tracks per inch, and for remapping hot tracks that have "cooled" to a main storage area with a higher number of tracks per inch. Media scan and repair activity that would consume resources is reduced by lowering the likelihood of ATI issues in remapped tracks. Embodiments of the present disclosure are applicable to use with a number of different types of HDDs, including but not limited to conventional magnetic recording (CMR), shingled magnetic recording (SMR), and heat-assisted magnetic recording (HAMR).

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    monitoring operations performed on tracks in a main storage area of a disc;
    identifying a track of the tracks in the main storage area susceptible to adjacent track interference (ATI);
    remapping the identified track or an adjacent track which contributes to ATI of the identified track to an ATI safe zone of the disc having a tracks per inch (TPI) density lower than a TPI density of the main storage area; and
    when the identified track is remapped to the ATI safe zone, remapping the identified track back to its original location in the main storage area when a write frequency to the adjacent track in the main storage area falls below a threshold write frequency.

2. The method of claim 1, wherein identifying a track of the tracks in the disc comprises identifying based on a threshold scan frequency of the track.

3. The method of claim 1, wherein remapping to an ATI safe zone comprises remapping to one of a safe zone at an inner diameter of the disc or a safe zone at an outer diameter of the disc.

4. A method, comprising:
    monitoring tracks in a hard disc drive (HDD) for scan frequency, the scan frequency being a frequency at which the tracks are scanned as part of a data loss avoidance process;
    designating a track in a main storage area of the HDD as an adjacent track interference (ATI) hot track when its scan frequency exceeds a predetermined scan frequency threshold; and
    remapping the designated ATI hot track to an ATI safe zone having tracks with lower susceptibility to ATI.

5. The method of claim 4, wherein remapping is performed on a next scan of the designated ATI hot track after its designation as an ATI hot track.

6. The method of claim 4, and further comprising designating a track in an ATI safe zone as an ATI cold track when its write frequency drops below a predetermined write frequency.

7. The method of claim 6, and further comprising remapping the designated ATI cold track to the main storage area.

8. The method of claim 7, wherein remapping is performed within a media repair task.

9. The method of claim 4, and further comprising:
determining when the ATI safe zone is at a threshold level of fullness;
when the ATI safe zone is at or above the threshold level of fullness, determining whether tracks in the ATI safe zone are at a write frequency lower than a current designated ATI hot track; and
before remapping the current designated ATI hot track to the ATI safe zone, remapping a track in the ATI safe zone that is at a write frequency lower than the current designated ATI hot track to the main storage area.

10. The method of claim 4, wherein remapping to an ATI safe zone comprises remapping to a safe zone at an inner diameter of a disc of the HDD.

11. The method of claim 4, wherein remapping to an ATI safe zone comprises remapping to a safe zone at an outer diameter of a disc of the HDD.

12. The method of claim 4, wherein remapping to an ATI safe zone comprises remapping to at least one of a safe zone at an inner diameter of a disc of the HDD or a safe zone at an outer diameter of a disc of the HDD.

13. An apparatus, comprising:
a data storage medium comprising a plurality of tracks, including tracks in a main storage area having a first tracks per inch density, and tracks in an ATI safe zone having data-free tracks interspersed between write-permitted tracks; and
a controller communicatively coupled to the data storage medium, the controller configured to:
monitor operations performed on the tracks in the main storage area;
identify a track of the tracks in the main storage area susceptible to adjacent track interference (ATI); and
remap the identified track or an adjacent track which contributes to ATI of the identified track to one of the write-permitted tracks in the ATI safe zone.

14. The apparatus of claim 13, wherein the controller is further configured to identify a track of the tracks susceptible to ATI based on a threshold scan frequency of the track.

15. The apparatus of claim 13, wherein the data storage medium comprises at least one disc, and wherein the tracks in the ATI safe zone are at an outer diameter of the data storage medium disc.

16. The apparatus of claim 13, wherein the data storage medium comprises at least one disc, and wherein the tracks in the safe zone are at an inner diameter of the data storage medium disc.

17. The apparatus of claim 13, wherein the controller is further configured to, when the identified track is remapped to the write-permitted track in the ATI safe zone, remap the identified track back to its original location in the main storage area when a write frequency to the adjacent track in the main storage area falls below a threshold write frequency.

18. The apparatus of claim 13, wherein the controller is further configured to, when the adjacent track is remapped to the write-permitted track in the ATI safe zone, remap the adjacent track back to its original location in the main storage area when a write frequency to the adjacent track in the ATI safe zone falls below a threshold write frequency.

19. A method, comprising:
monitoring operations performed on tracks in a main storage area of a disc;
identifying a track of the tracks in the main storage area susceptible to adjacent track interference (ATI);
remapping the identified track or an adjacent track which contributes to ATI of the identified track to an ATI safe zone of the disc having a tracks per inch (TPI) density lower than a TPI density of the main storage area; and
when the adjacent track is remapped to the ATI safe zone, remapping the adjacent track back to its original location in the main storage area when a write frequency to the adjacent track in the ATI safe zone falls below a threshold write frequency.

20. The method of claim 19, wherein identifying a track of the tracks in the disc comprises identifying based on a threshold scan frequency of the track.

21. The method of claim 19, wherein remapping to an ATI safe zone comprises remapping to one of a safe zone at an inner diameter of the disc or a safe zone at an outer diameter of the disc.

* * * * *